(12) United States Patent
Ibuki et al.

(10) Patent No.: US 6,441,571 B1
(45) Date of Patent: Aug. 27, 2002

(54) VIBRATING LINEAR ACTUATOR AND METHOD OF OPERATING SAME

(75) Inventors: Yasuo Ibuki; Hidetoshi Amaya; Toyokatsu Okamoto, all of Shiga-ken (JP)

(73) Assignee: Matsushita Electric Works, Ltd., Osaka (JP)

( * ) Notice: Subject to any disclaimer, the term of this patent is extended or adjusted under 35 U.S.C. 154(b) by 77 days.

(21) Appl. No.: 09/695,326

(22) Filed: Oct. 25, 2000

(30) Foreign Application Priority Data

Oct. 26, 1999 (JP) ............................................ 11-304731

(51) Int. Cl.[7] .............................................. H02K 33/02
(52) U.S. Cl. ........................ 318/114; 318/128; 310/20; 30/277.4
(58) Field of Search ................................. 318/114, 127, 318/128, 129; 310/17, 20, 31, 36; 30/29.5, 34.1, 43.7, 43.91, 43.92, 44, 45, 210, 277.4, 369

(56) References Cited

U.S. PATENT DOCUMENTS

| | | | |
|---|---|---|---|
| 5,012,593 A | * | 5/1991 | Okada et al. ................... 34/69 |
| 5,658,132 A | | 8/1997 | Akazawa et al. .............. 417/45 |
| 5,736,797 A | | 4/1998 | Motohashi et al. ........... 310/36 |
| 5,921,134 A | | 7/1999 | Shiba et al. ............... 310/20 X |
| 6,098,288 A | | 8/2000 | Miyagawa et al. ........ 30/43.91 |

FOREIGN PATENT DOCUMENTS

| | | |
|---|---|---|
| EP | 0652632 | 5/1995 |
| JP | 8-331826 | 11/1996 |

* cited by examiner

*Primary Examiner*—Tran Nguyen
*Assistant Examiner*—Judson H. Jones
(74) *Attorney, Agent, or Firm*—Greenblum & Bernstein, P.L.C.

(57) ABSTRACT

Vibrating linear actuator and method of operating same. The actuator of the invention includes a stator, a spring vibration system having a moving portion with a magnet and further having a spring configured to support the moving portion. The actuator further includes an electromagnetic coil configured to receive an electrical current, whereupon the coil moves the moving portion against a load supplied by the spring to reciprocally move the moving portion, a frequency detector configured to detect a natural frequency of the spring vibration system, and a frequency controller configured to determine a frequency of an electrical current pulse, the pulse to be received by the coil, in accordance with a detection result of the detector.

26 Claims, 13 Drawing Sheets

VIBRATING LINEAR ACTUATOR AND METHOD OF OPERATING SAME

BACKGROUND OF THE INVENTION

1. Field of the Invention

The present invention relates to a linear actuator and method of operating the same for generating a reciprocating vibration, and more particularly relates to a vibrating linear actuator for use in a small appliance, e.g., a reciprocating electric shaver, or the like.

2. Description of the Related Art

A known vibrating linear actuator used for a reciprocating electric shaver is disclosed in Japanese unexamined patent publication No. 8-331826 and its counterpart, U.S. Pat. No. 5,736,797, which issued to Motohashi, et al. on Apr. 7, 1998. This known actuator includes a stator made of an electromagnet or a permanent magnet, and a moving portion that has or includes a permanent magnet or an electromagnet and is supported by a spring. This known vibrating linear actuator is supported by the spring, and the moving portion embodied as a spring vibration system can be vibrated at a natural frequency (i.e., a resonance frequency) of the spring vibration system. Thus, energy that is necessary for driving the system can be reduced. In addition, power supplied to a coil of the electromagnet can be controlled in accordance with an output of a detection system for detecting at least one of a displacement, a velocity and an acceleration of the moving portion, so that a vibration having a constant amplitude can be maintained despite a load variation.

However, though the above-mentioned feedback control is effective where a load variation is large, it is somewhat less than adequate when applied to devices having a small load variation in that it is more costly to use a feedback control system for a small fluctuating load. Since such feedback controls maintain the amplitude at a constant level by detecting every amplitude of the moving portion and by controlling the pulse width supplied to the coil of the electromagnet, costs associated with such feedback control are high.

Costs can be reduced by adding a fixed output quantity at a timing adapted to a predetermined frequency without using a feedback control system for making the amplitude constant. However, a vibration system including a spring has a varying natural frequency due to varying masses of manufactured individual springs (i.e., each spring used in each actuator can have a different mass based upon the manufacturing tolerances with respect to the mass of the spring). Therefore, when controlling the power supplied to a coil using a fixed frequency, the natural frequency does not match the control frequency, and the drive efficiency drops, resulting in a large power consumption and a condition where the vibration of the moving portion does not reach a predetermined amplitude. In addition, the life of the spring is shortened since the spring operates at a point away from the resonance point.

SUMMARY OF THE INVENTION

The present invention provides a vibrating linear actuator and method of operating the same, that increases drive efficiency without using an amplitude feedback control system. The actuator of the present invention includes a stator, a spring vibration system having both a moving portion having a magnet, and a spring configured to support the moving portion. The actuator further has an electromagnetic coil configured to receive an electrical current, whereupon the coil moves the moving portion against a load supplied by the spring to reciprocally move the moving portion. The actuator further includes a frequency detector configured to detect a natural frequency of the spring vibration system, and a frequency controller configured to determine a frequency of an electrical current pulse, the pulse to be received by the coil, in accordance with a detection result of the detector. Thus, the vibrating linear actuator of the present invention can vibrate the spring vibration system at its natural frequency without being affected by variation in the mass of the spring vibration system.

Additionally, the stator may include either an electromagnet or a permanent magnet, and similarly, the magnet of the moving portion may include either an electromagnet or a permanent magnet. The invention may further include an amplitude detector configured to detect a signal corresponding to an amplitude of the moving portion, and either or both of the frequency detector and the frequency controller is further configured to determine (i.e., set) a drive frequency by deriving the natural frequency from a variation of an amplitude value while incrementally altering the frequency of the current pulse to be supplied to the coil.

The drive frequency may be determined (i.e., set) when the amplitude value reaches its maximum or alternatively, can be determined when the amplitude value reaches a predetermined value or greater than the predetermined value.

In another embodiment, the actuator of present invention may further include a current value measuring device configured to measure a drive current supplied to the coil, and either or both of the frequency detector and frequency controller may be configured to determine a drive frequency by deriving the natural frequency from a variation of a drive current value while incrementally altering the frequency of the current pulse to be supplied to the coil.

The drive frequency may be a frequency when the drive current value reaches the minimum value or can be a frequency when the drive current value reaches or falls below a predetermined value.

The natural frequency may be determined under the condition that the current is not supplied to the coil. Preferably, the natural frequency may be determined at the end of the period while current is not supplied to the coil.

A pulse width of the drive current pulse can be decreased when the detected natural frequency is not within a predetermined range. In addition, current supply to the coil can be interrupted when the detected natural frequency is out of a predetermined range for a predetermined time or greater, so that needless power consumption can be avoided.

Furthermore, current supply to the coil can be interrupted when the detected natural frequency has not changed for a predetermined time, thereby preventing excess power consumption.

The method for vibrating a linear actuator includes, supplying the electromagnetic coil with electrical current, reciprocally moving the coil against a load supplied by the spring, in response to the supplying of current, detecting a natural frequency of the spring vibration system, determining a frequency of an electrical current pulse, in accordance with the detected natural frequency, and supplying the current pulse to the coil.

The method may further include sensing a signal corresponding to an amplitude of the moving portion, and determining a drive frequency by deriving the natural frequency from a variation of an amplitude value while incrementally altering the frequency of the current pulse to be supplied to the coil.

Additionally, the drive frequency may be determined when the amplitude value reaches a maximum value, or alternatively, when the amplitude value reaches or exceeds a predetermined value.

The method may also include measuring a drive current supplied to the coil, and determining a drive frequency by deriving the natural frequency from a variation of a drive current value while incrementally altering the frequency of the current pulse to be supplied to the coil.

Further, the drive frequency may be determined when the drive current value reaches a minimum value, or alternatively, when the drive current value reaches or falls below a predetermined value.

Also, the natural frequency may be determined while current is not being supplied to the coil, or alternatively, at the end of a predetermined period and while the current is not supplied to the coil.

The method may yet still further include decreasing a pulse width of the current pulse when the detected natural frequency is not within a predetermined range. The current supply to the coil may be interrupted when the detected natural frequency is out of the predetermined range for a predetermined time period, or alternatively, when the detected natural frequency remains unchanged for a predetermined time period.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 3:
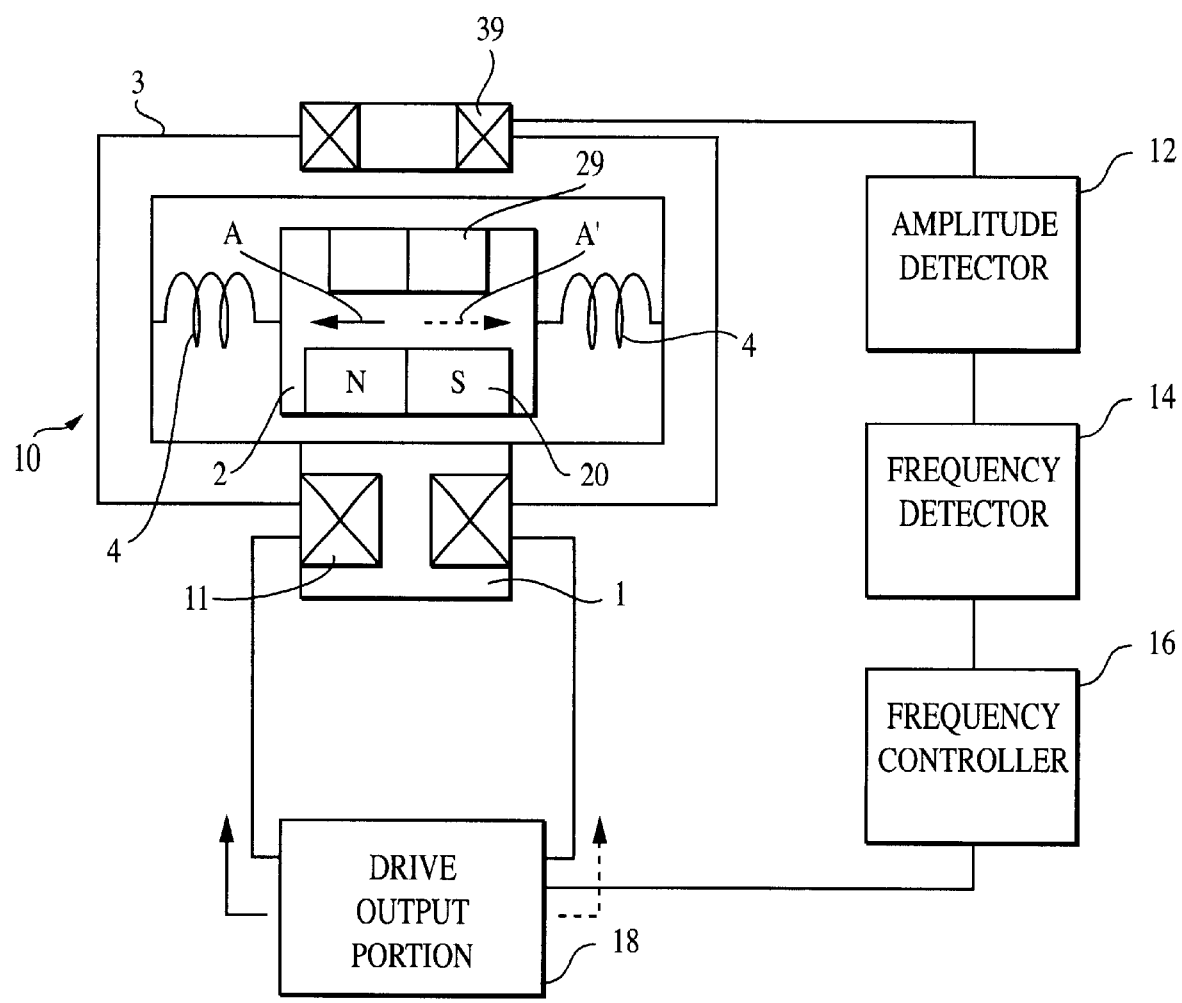
FIG. 3 is a block diagram of the first preferred embodiment of the present invention.

Referring to the drawings wherein like numerals represent like elements, FIG. 3 shows a vibrating linear actuator 10 according to a first preferred embodiment of the present invention. The actuator 10 includes a stator 1 having a coil 11, and being fixed to a frame 3. Attached to the frame 3 is a moving portion 2 that is supported by springs 4 that are each affixed to the frame. The moving portion 2 reciprocates in the direction of arrows A, A' by deforming the springs 4 and has a permanent magnet 20 that has magnetic poles N, S arranged at the side of the moving portion opposing the stator 1. The moving portion 2 is equipped with a sensing magnet 29, and the frame 3 is equipped with a sensor coil 39 in which voltage is induced by movement of the sensing magnet 29.

The coil 11 of the stator 1 is supplied with a current whose direction is switched at a predetermined period, so that the moving portion 2 is driven to reciprocate. However, in the alternative, the current may be supplied to the coil 11 only in one direction so that the moving portion 2 is driven to move in one direction by the current and moves in the opposite direction by the spring force of the spring 4.

The spring 4 and the moving portion 2 supported by the spring 4 constitute a spring vibration system that has a natural frequency f0 defined by the following equation:

$$f0 = (1/2\pi) \cdot (k \cdot M)^{1/2};$$

where k is a constant defined by the spring force of the spring 4 and the horizontal component of a magnetic power, M is a mass that is a sum of the moving portion 2 and the members attached to the moving portion 2. In the above-mentioned drive by the current supply, the moving portion is driven at a frequency that is identical to the natural frequency f0 of the system, so that the spring vibration system can reciprocate (or vibrate at a resonant frequency), resulting high efficiency of the reciprocating vibration of the moving portion 2.

Figure 4:
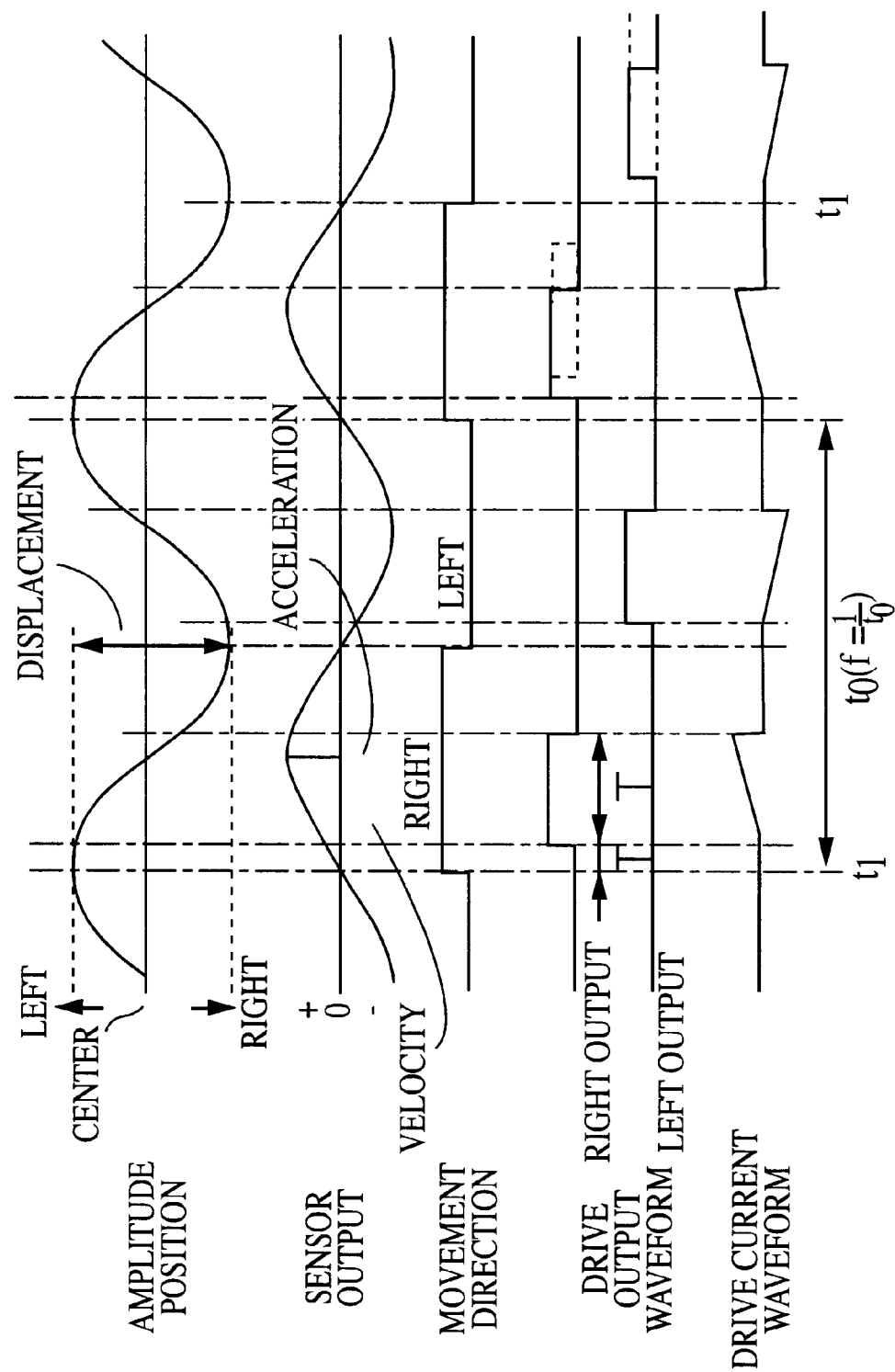
FIG. 4 is a timing chart, showing the present invention in a driving state.

As discussed above, the natural frequency f0 of each spring 4 has a varies due to varying masses of manufactured individual springs. To maintain the efficiency of the actuator, the natural frequency f0 of the spring vibration system is detected, and a drive pulse current having a frequency that is identical to the detected natural frequency and that has a fixed width T is supplied to the coil 11 by a drive output portion 18. Specifically, as shown in FIG. 3, the natural frequency f0 is detected by detecting the amplitude using an amplitude detector 12, and detecting the frequency from the output of the sensor 39, using a frequency detector 14. When the drive current pulse is supplied to the coil 11 so that the moving portion 2 reciprocally vibrates in the direction of arrows A and A' (shown in FIG. 3), the sensor 39 generates an output signal, as shown in FIG. 4. The greater the amplitude of the moving portion 2 and the maximum velocity and the acceleration, the greater the output variation of the sensor 39 becomes. Therefore, the amplitude of the moving portion 2 can be estimated, and the frequency can be detected as the inverse of the period t0.

Figure 5:
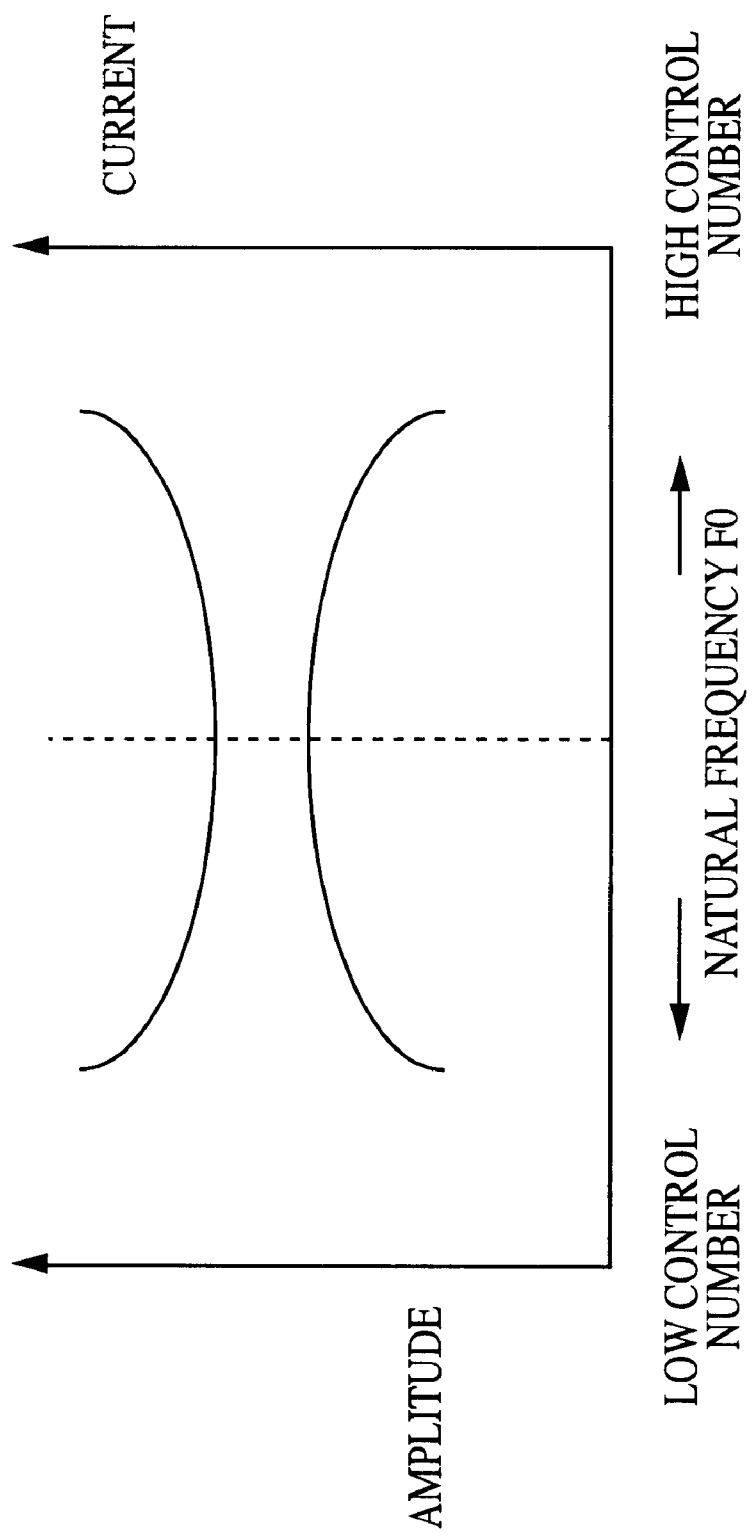
FIG. 5 is a diagram showing the relationship between frequency, amplitude and current with respect to the functioning of the present invention.

If the drive frequency f is identical to the natural frequency f0, the amplitude reaches maximum, and the current reaches a minimum value, as shown in FIG. 5. However, when the drive frequency f is higher or lower than the natural frequency f0, the amplitude decreases, and the drive current increases.

Figure 6:
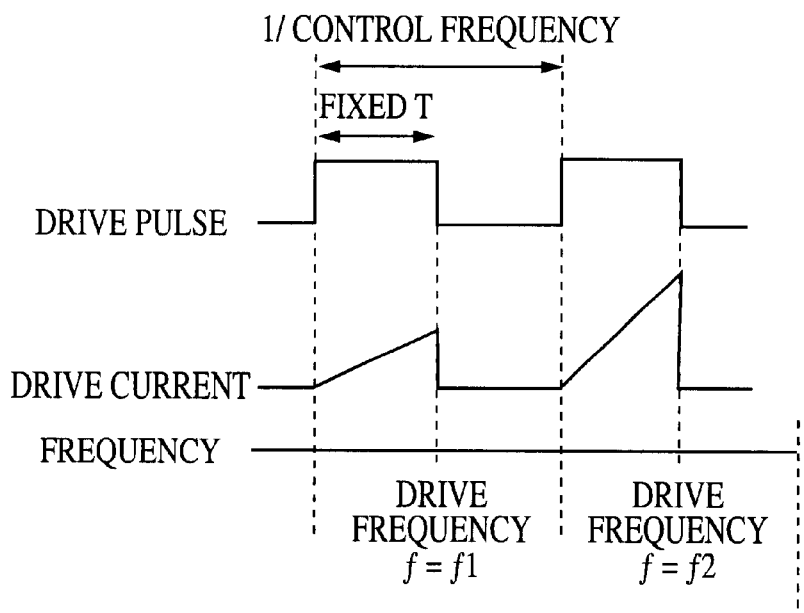
FIG. 6 is a timing chart, showing a variation of the current in the present invention.

In FIG. 6, the left side of the figure shows a situation where the difference between the drive frequency (f=f1) and the natural frequency is small, while the right side of the figure shows a situation where the difference between the drive frequency (f=f2) and the natural frequency is large. Additionally, the current value shown on the left side of the figure is less then the current value shown on the right of the figure.

The natural frequency can be determined in accordance with FIG. 6. For example, if the drive frequency is incrementally changed, the drive current decreases and at the same time the amplitude gradually increases. Consequently, the natural frequency f) can be determined as the natural frequency is the frequency when the current is at its minimum or when the amplitude is at its maximum.

Figure 1:
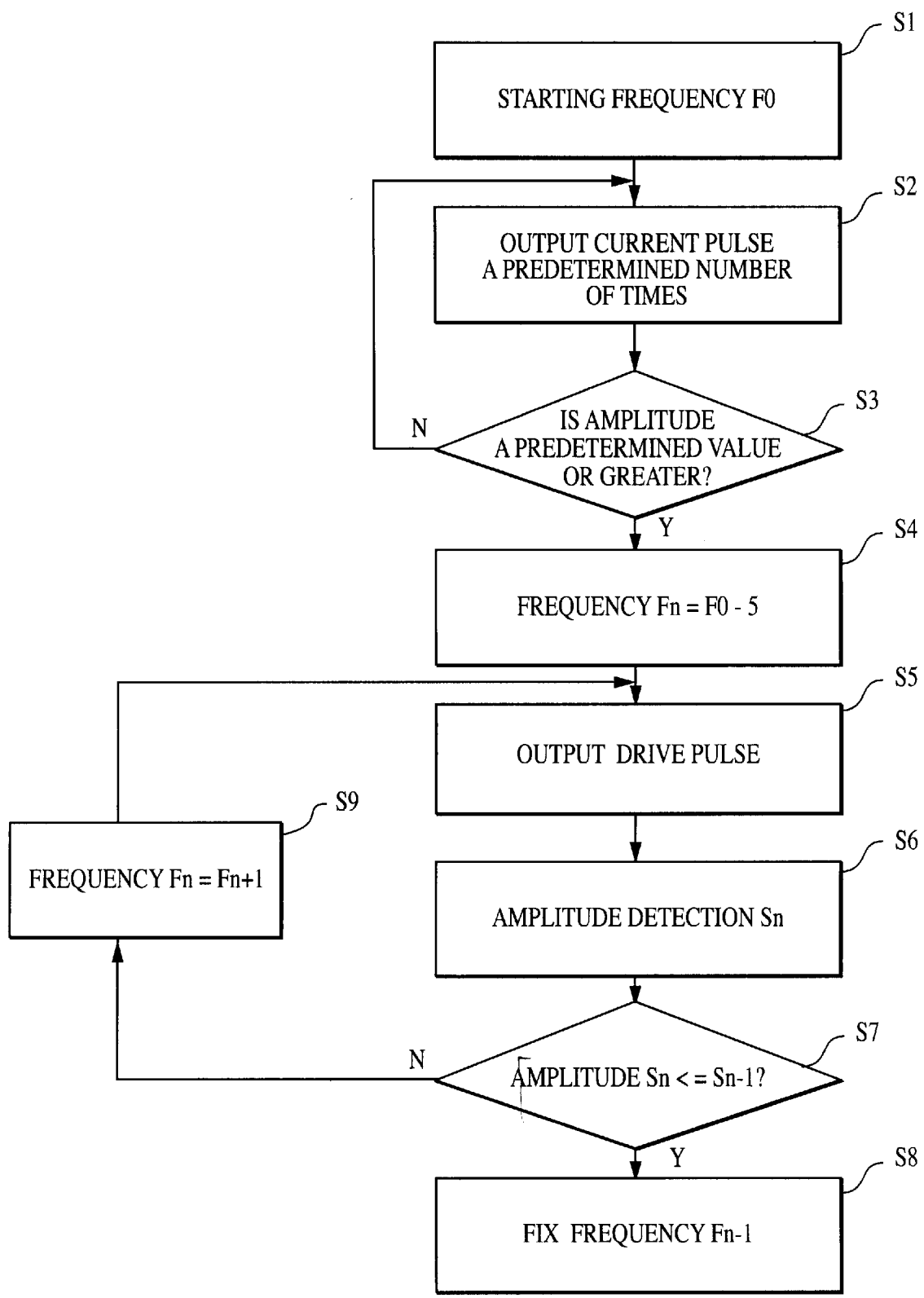
FIG. 1 is a flow chart showing an operation of a first preferred embodiment of the present invention.

Next, the operation of the actuator 10 will be explained with reference to a control flow chart shown in FIG. 1. The initial drive frequency f is the designed natural frequency f0 for starting at step S1, and the current pulse having a fixed width T is outputted a predetermined number of times at step S2. When the oscillation amplitude of the moving portion 2 reaches a predetermined value or greater at step S3, the drive frequency fn is dropped once by a predetermined amount at step S4 (In the flowchart shown in FIG. 1, the drive frequency fn is decreased from the initial value by five). If the amplitude does not reach a predetermined value or greater at step S3, the processing returns to step S2. At step S5 a drive pulse is output (i.e., the drive frequency in is increased incrementally), and at step S6 the amplitude is detected. At step S7 it is determined whether the amplitude Sn is smaller than the previous amplitude Sn−1. If, at step S7, the amplitude Sn is less than Sn−1, it is determined that the previous amplitude Sn−1 was the maximum amplitude, and the frequency fn is the natural frequency, and the next successive drive of the actuator is performed with the current drive frequency fn−1 fixed at step S8. The current pulse having the fixed width T is supplied to the coil 11 at the drive frequency fn−1. If, at step S7, it is determined that the amplitude Sn is greater than Sn−1, the frequency fn is increased by one (1) at step S9, whereupon the processing is redirected to step S5.

Figure 2:
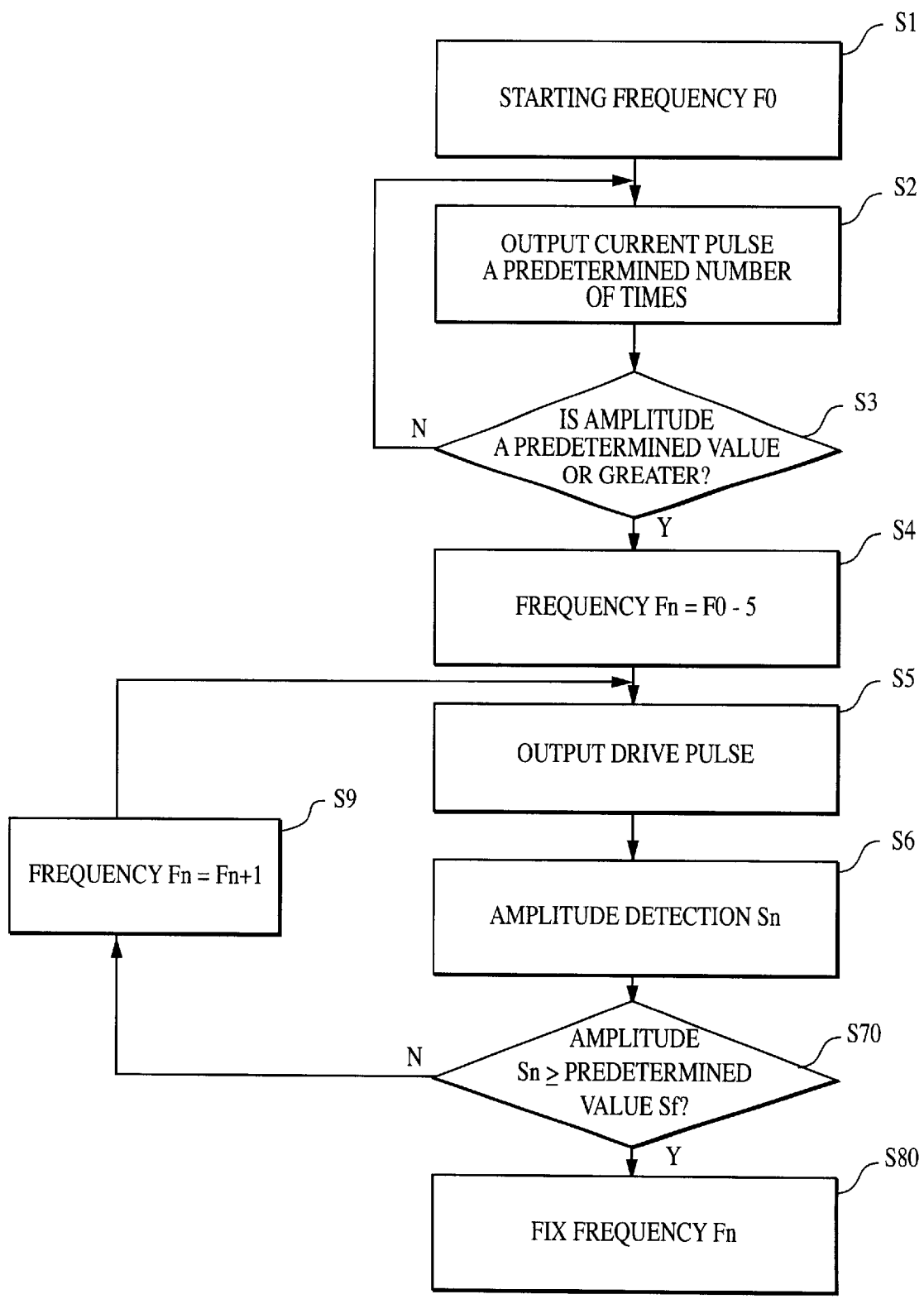
FIG. 2 is a flow chart showing a modified operation of the first preferred embodiment of the present invention.

FIG. 2 shows a flow chart explaining a modified operation of the present invention. The processing of FIG. 2 is identical to that of FIG. 1, except that step S7 is replaced by step S70 and step S8 is replaced by step S80. At step S70, it is determined whether the amplitude Sn is greater than or equal to a predetermined stored value Sf. If "yes," then at step S80, the following drive (i.e., the next sequential drive period) is performed at the current frequency fn, thus considering that the vibration is at the natural frequency. If "no," then the processing goes from step S70 to S9, where the frequency is increased, the same as with the processing of FIG. 1.

Figure 7:
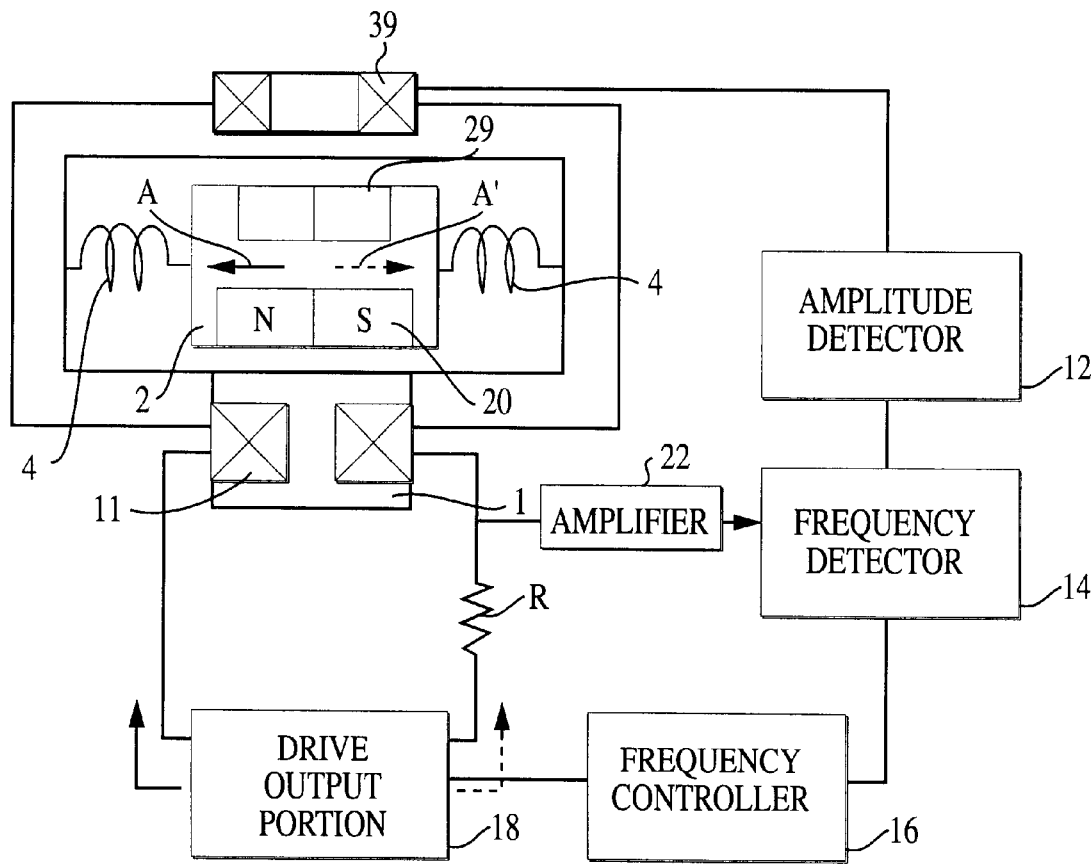
FIG. 7 is a block diagram of the second preferred embodiment of the present invention.

Alternatively, instead of determining the drive frequency from the amplitude Sn, it can be decided from the drive current value In. FIG. 7 shows a linear actuator 100 according to a second preferred embodiment of the present invention. Differing from the actuator 10 of FIG. 3, a current detecting resistor R (i.e., a current detecting system) is inserted in the drive circuit so as to measure the drive current. Further, the resistor R is operably connected to the frequency detector 14 via an amplifier 22.

Figure 8:
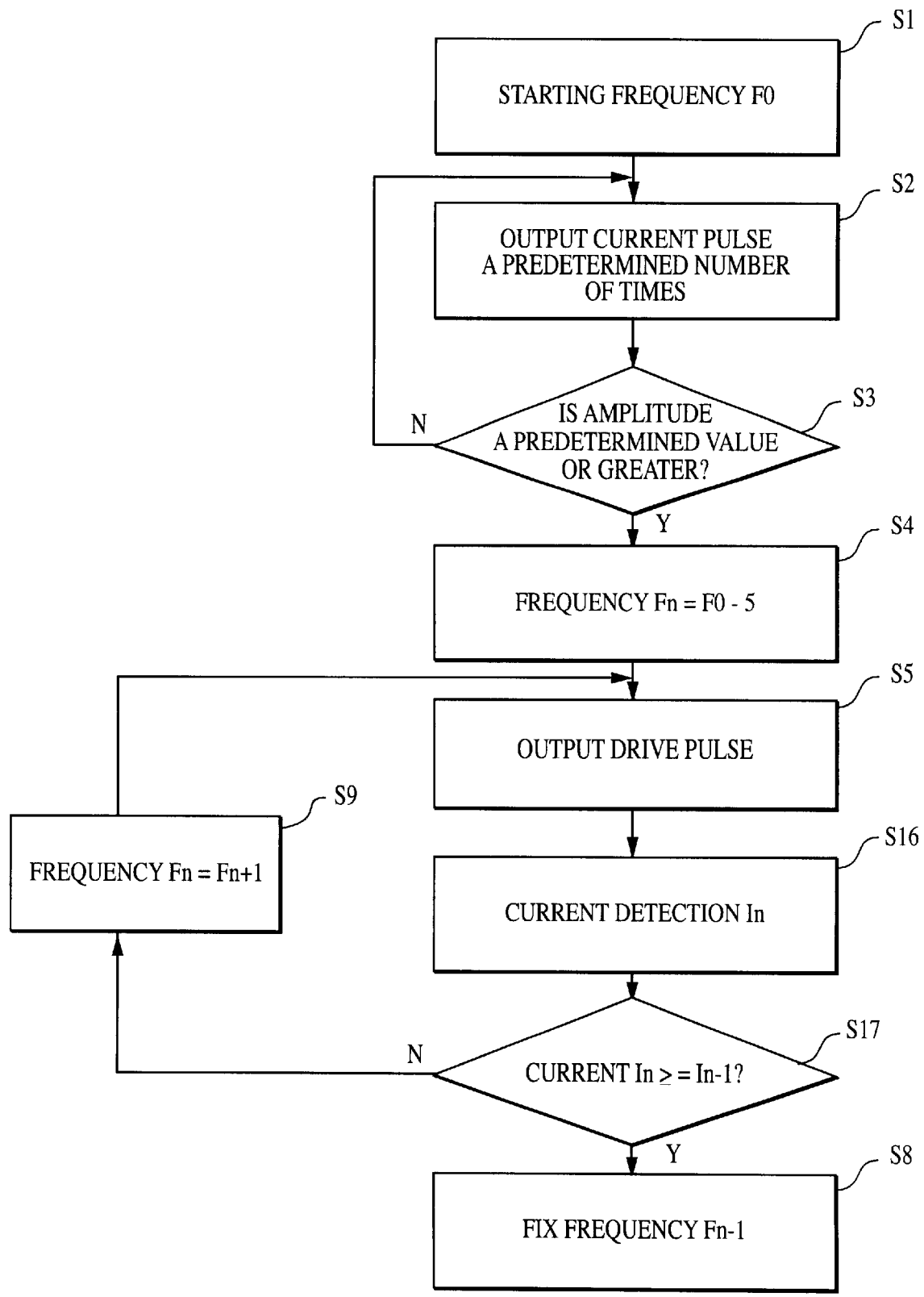
FIG. 8 is a flow chart showing an operation of the second preferred embodiment of the present invention.

A process for operating the actuator 100 of the second embodiment is shown in FIG. 8. The drive frequency is incrementally increased in the second embodiment. The processing is the same as that of FIG. 1, except that steps S16 and S17 replace steps S6 and S7 of FIG. 1. Specifically, at step S16 the current In is detected, and at step S17, it is determined whether the current value In is greater than or equal to previous current value In−1. If "yes," then at S8 the previous drive frequency fn−1 is fixed for the next driving of the moving portion 2, as with the FIG. 1. If "no," the frequency fn is increased by one (1) at step S9, also as with FIG. 1.

Figure 9:
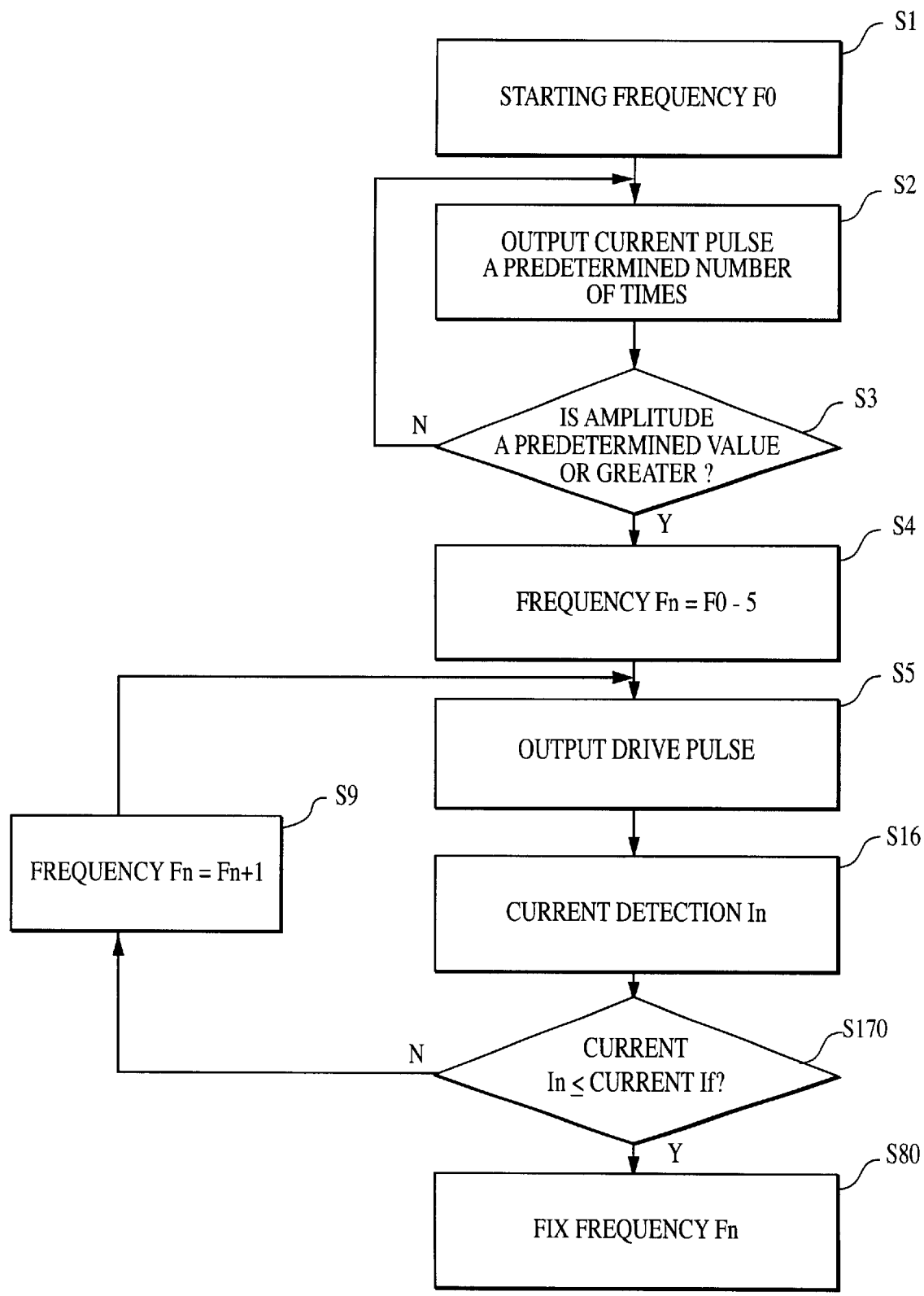
FIG. 9 is a flow chart showing a modified operation of the second preferred embodiment of the present invention.

FIG. 9 shows an additional operational process for the second embodiment. Steps S1–S5 are the same as those of FIG. 1, step S16 is the same as that of FIG. 8, and step S80 is the same as that of FIG. 2. In FIG. 9, after step S16 it is determined whether the current value In is less than or equal to predetermined value If. If "yes," the processing is proceeds to step S80, where the current drive frequency fn is used for the following drive, thus considering the vibration is at the natural frequency, and if "no," the processing is directed to step S9.

Figure 10:
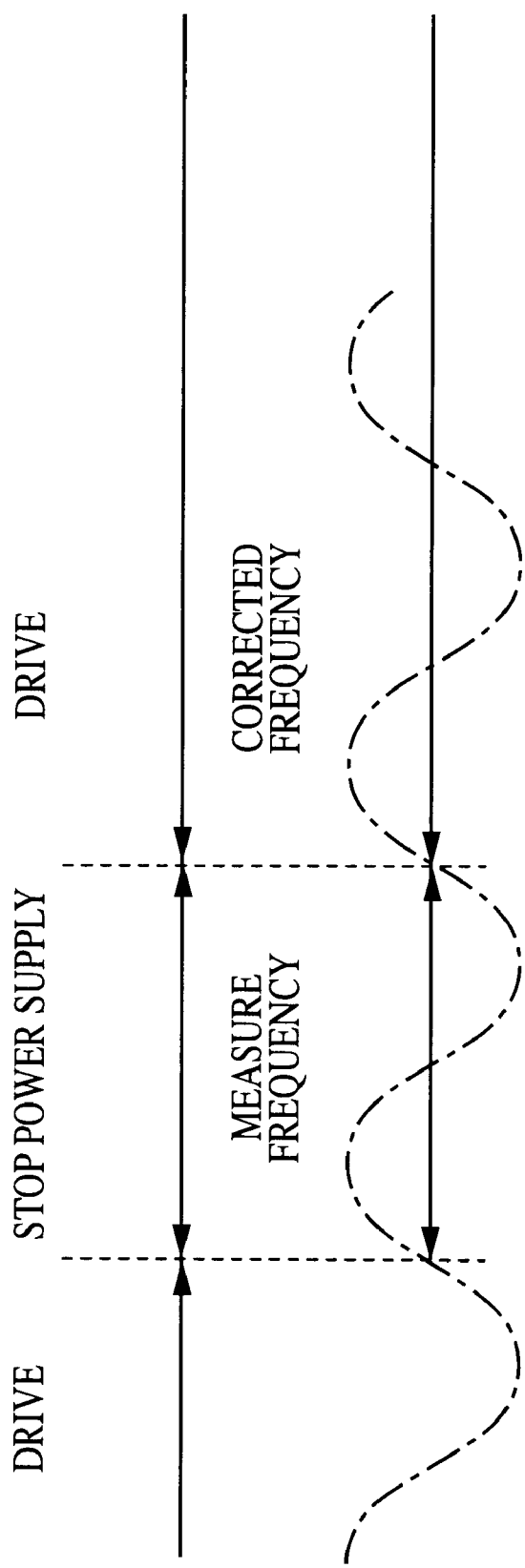
FIG. 10 is a timing chart, showing an operation of the present invention.

When the amplitude and the frequency are measured in the driving state (i.e., during driving of the moving portion 2), driving may be performed at a frequency higher or lower than the real natural frequency because of an influence of a power supply (not shown) on the coil 11. In order to avoid this influence, as shown in FIG. 10, the supply of power to the coil 11 is interrupted for a short period of time such as one period or two periods. During this interrupted period, amplitude and frequency are measured based upon the output of the sensor 39.

Figure 11:
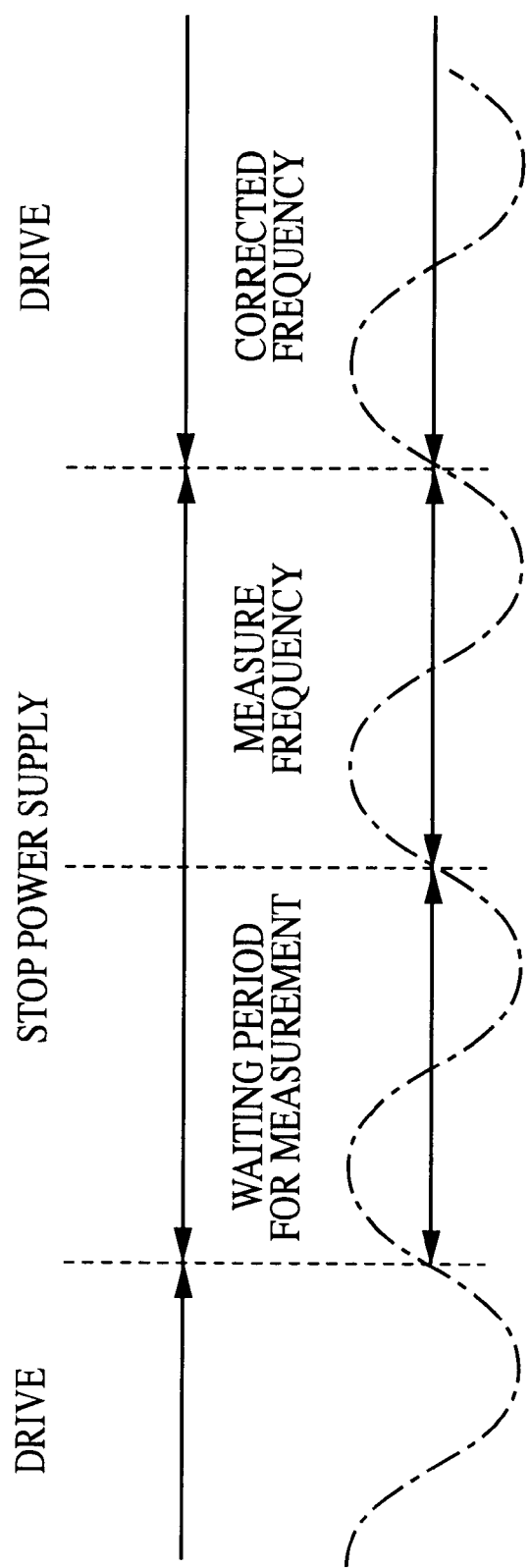
FIG. 11 is a timing chart, showing a modified operation of the present invention.

Even if the power supply is interrupted, the vibration frequency of the moving portion 2 does not change immediately. As shown in FIG. 11, two periods may be set as the interval during which the power supply to the coil 11 is interrupted, thus enabling a predetermined time (i.e., one period) to pass after the interruption (before measurement) so that the vibration of the moving portion 2 becomes stable at the natural frequency, at which time the above-mentioned measurement may be performed, and after this measurement, the power supply to the coil 11 can be restarted.

When using the vibrating linear actuator 10, 100 as a drive source of a reciprocating electric shaver, the moving portion 2 may be attached to a drive element (not shown) for driving an inner blade (not shown). If the inner blade is removed from the drive element and the drive element is driven, the mass M decreases and the natural frequency of the spring vibration system changes. As a result, the mass cannot be driven at the natural frequency, and the drive current may increase.

Figure 12:
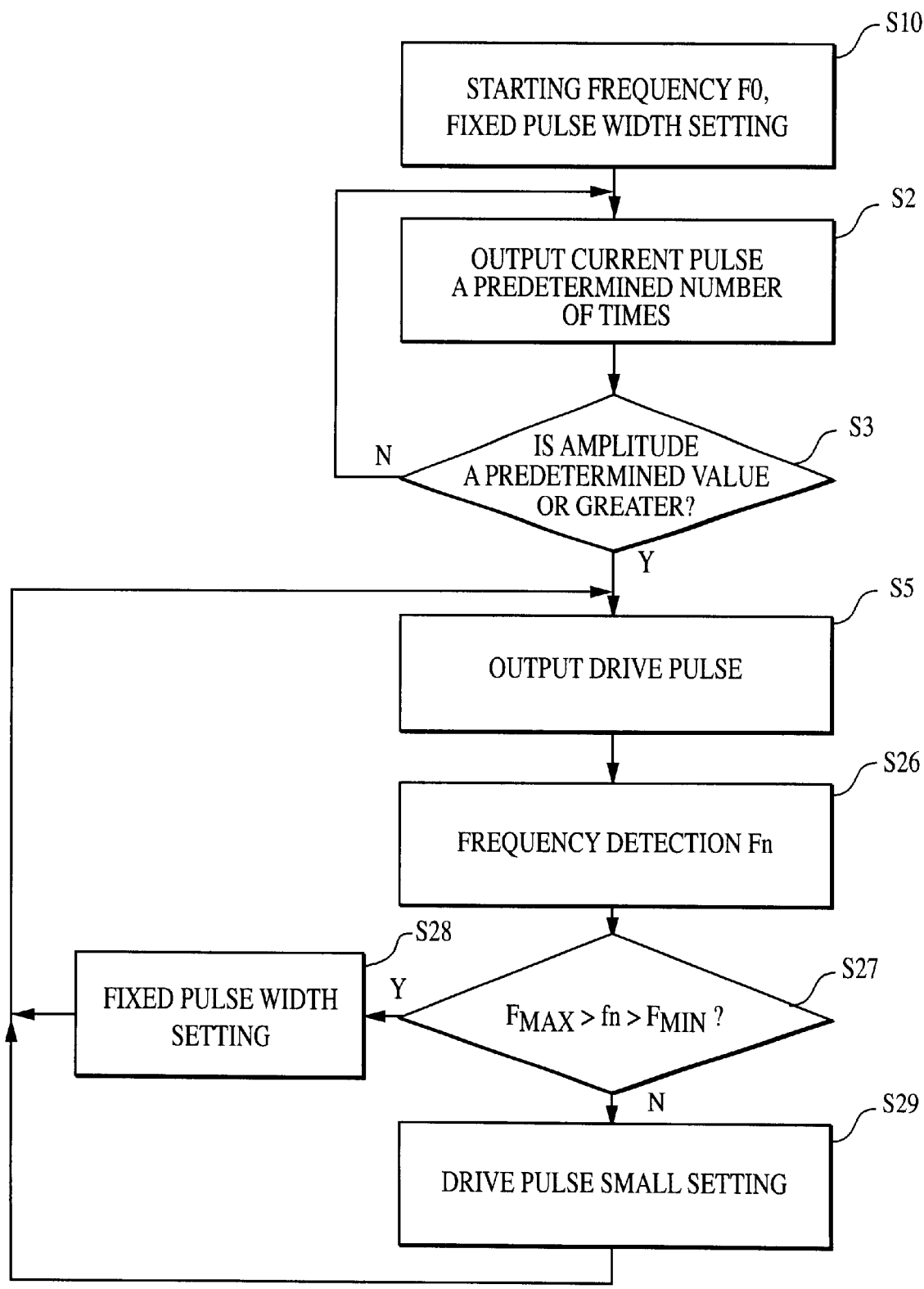
FIG. 12 is a flow chart showing a further alternative operation of the present invention.

In order to avoid this situation, an additional feature of the present invention is employed, as shown in the process of FIG. 12. At step S10, the drive frequency f is the design natural frequency f0 and the fixed pulse width is set. Steps S2, S3 and S5 are the same as in FIG. 1, however step S4 has been omitted, and the processing proceeds from step S3 to step S5. From step S5, the processing proceeds to step S26 where the frequency fn is detected (the natural frequency).

At step S27 it is determined whether the detected frequency fn falls within predetermined range between frequency Fmax and predetermined frequency Fmin. If "yes," at step S28, the processing switches to a step where the drive current pulse having a fixed pulse width setting is supplied to the coil 11 and is different than that of S10, whereupon the processing proceeds back to step S5. If "no," (i.e., the detected frequency fn is larger than a predetermined frequency Fmax or is smaller than a predetermined frequency Fmin) at step S29 the processing switches to a position where the drive current pulse having a width smaller than a predetermined drive current pulse width is supplied to the coil 11, whereupon the processing proceeds back to step S5. Thus, the amplitude is decreased so that energy consumption and noise can be reduced.

Figure 13:
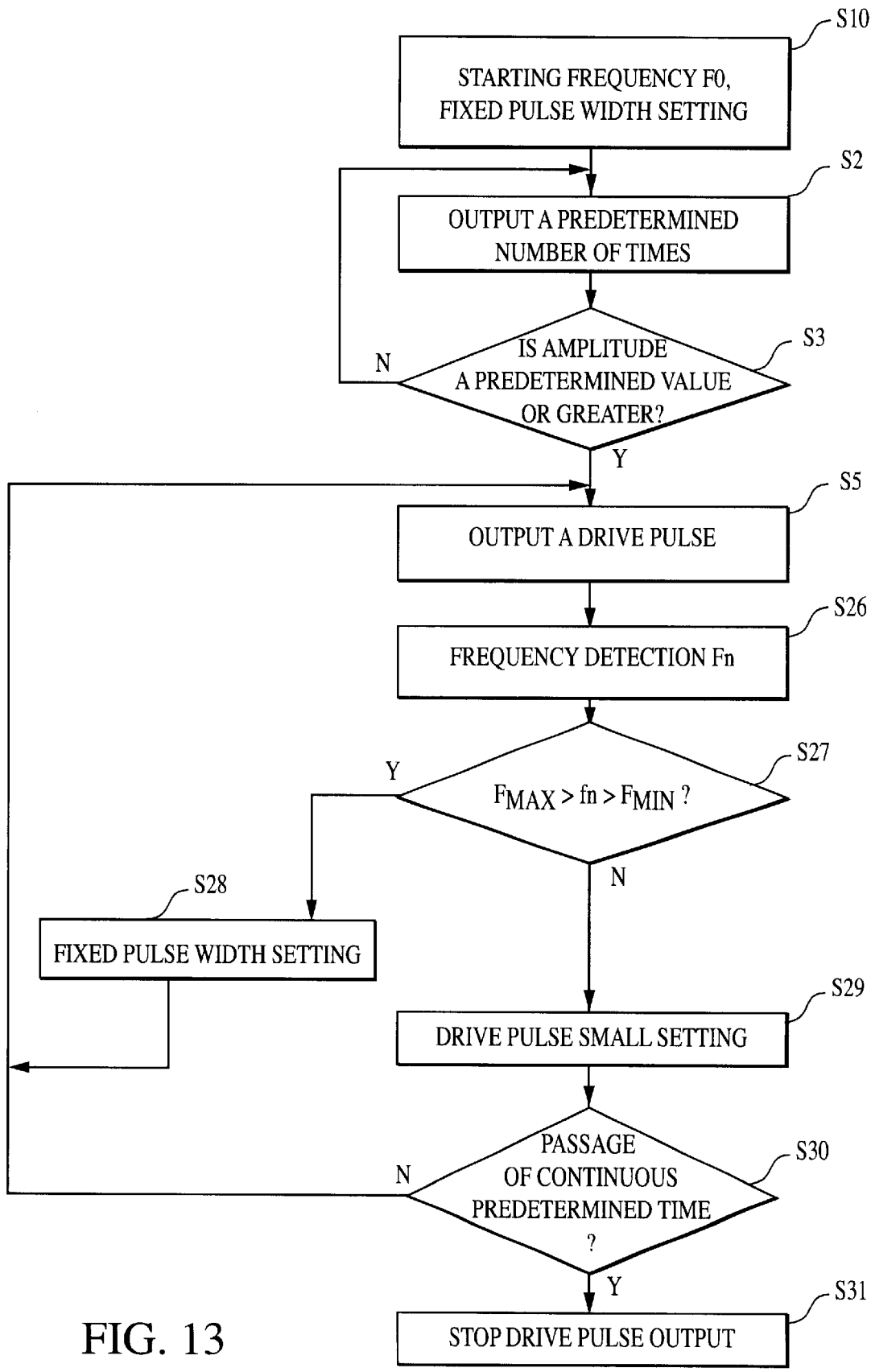
FIG. 13 is a flow chart showing another alternative operation of the present invention; and, FIG. 14 is a flow chart showing yet still another alternative operation of the present invention.

In addition, since it is not normal to operate an electric shaver or the like with the inner blade removed for an extended period of time, it is preferable to interrupt the output of the drive current pulse to the coil 11 where the detected frequency (the natural frequency) fn is out of a predetermined range for a predetermined time, as shown in FIG. 13, which shows such an additional operational process of the present invention. Specifically, in this process, the operation is similar to that of FIG. 12, except that after step S29, it is determined, at step S30, whether a continuous predetermined time has passed. If "yes," at step S31, the drive pulse output is stopped. If "no," then the processing is directed back to step S5. Thus, when the actuator is turned on with the inner blade removed, power supplied to the actuator is interrupted (i.e., the actuator is turned off) after a predetermined time period, thereby conserving power and preventing possible damage to the shaver.

Figure 14:
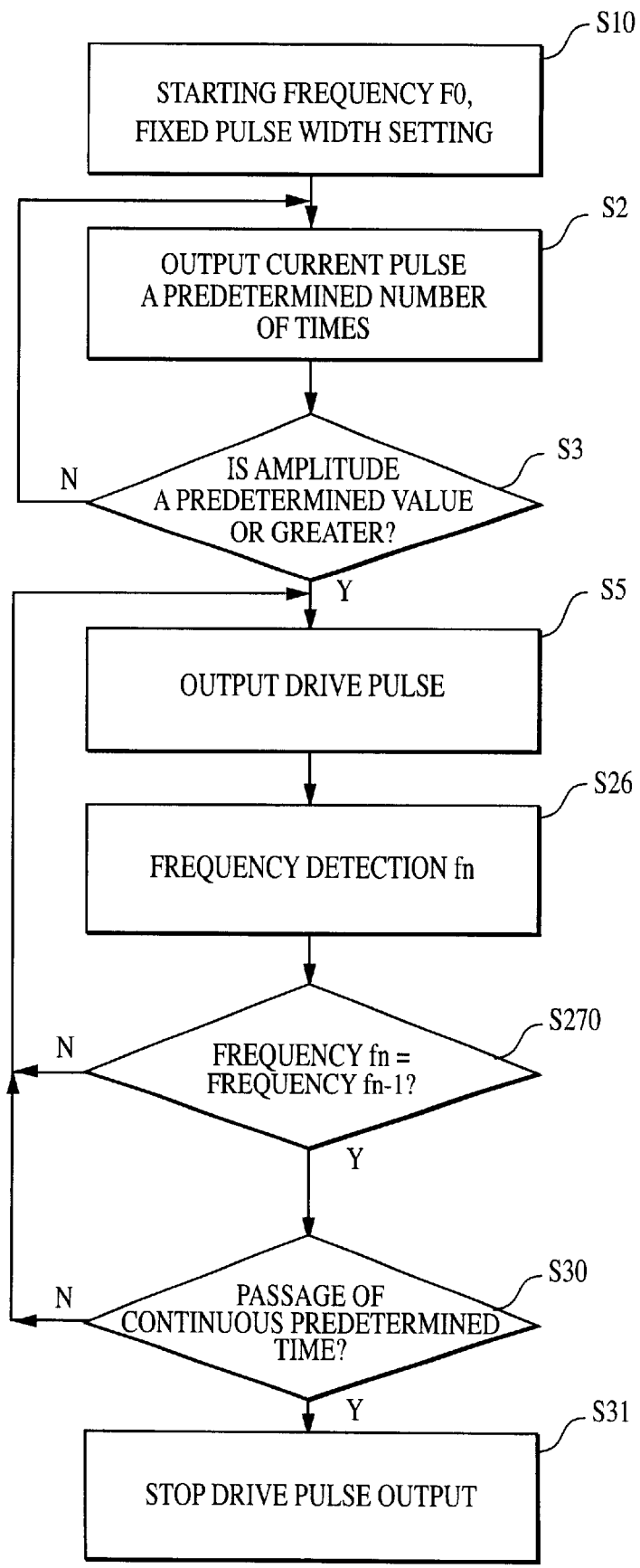

Furthermore, when the actuator 10, 100 is used as a drive source of an electric shaver or the like and while operating the shaver, a drive load is applied. If the amplitude decreases when the drive load is added, the frequency also changes. Therefore, where the detected frequency fn has not changed and continues in this unchanged state for a predetermined time period, driving of the actuator 10, 100 may be interrupted, shown in FIG. 14, which shows such an operational process. In FIG. 14, steps S10, S2, S3, S5, S26, S30 and S31 are performed in the same manner as with the process of FIG. 13. However, after S26, at step S270, it is determined whether the frequency fn is equal to the frequency fn–1. If "yes," then the processing is directed to step S30, which, as discussed above, is the same as that of FIG. 13. In this process, the actuator 10, 100 regards failure of the frequency to change as an abnormal state (e.g., the state where the switch inadvertently activated in a user's bag during transport), and stops the driving of the shaver, thereby avoiding unnecessary energy consumption.

As explained above, according to the present invention, a vibrating linear actuator 10, 100 is provided that includes a stator 1 made of an electromagnet or a permanent magnet, and a moving portion 2 including a magnet 20, which may be a permanent magnet or an electromagnet. The moving portion 2 is supported by a spring 4, and a coil 11 is supplied with a current so as to move the moving portion against a load supplied by the spring 4 to make the moving portion reciprocate in the direction of arrows A, A'. The actuator 10 also includes a frequency detector 14 for detecting a natural frequency of a spring vibration system made of the spring and the moving portion 2, and a frequency controller 16 for determining a frequency of a current pulse to be supplied to the coil in accordance with a detection result of the frequency detector. The vibrating linear actuator 10, 100 according to the present invention can vibrate the spring vibration system at its natural frequency without being affected by a variation of the spring vibration system. Further, the vibrating linear actuator 10 according to the present invention has a high drive efficiency and low cost.

The actuator 10 further includes an amplitude detector 12 that detects a signal corresponding to an amplitude of the moving portion 2 to be supplied to the coil 11. The amplitude detector 12 is operably connected to the frequency detector 14 and the frequency controller 16. The amplitude detector 12, frequency detector 14, frequency controller 16, and drive output portion 18 may be part of a CPU (not shown) which controls the operation of the actuator 10. The frequency controller is not part of the CPU of the actuator 100 of the second embodiment. The CPU may be configured to determine a drive frequency by deriving the natural frequency from a variation of a value of the amplitude while incrementally altering the frequency of the current pulse to be supplied to the coil 11. Alternatively, the drive frequency may be determined by the frequency detector 14 and/or the frequency controller 16, either or both of which may determine a drive frequency by deriving the natural frequency from a variation of a value of the amplitude while incrementally altering the frequency of the current pulse to be supplied to the coil 11. Thus, the actuator 10, 100 can correctly determine the natural drive frequency.

Though the drive frequency is generally a frequency when the amplitude reaches a maximum value, the drive frequency may also be a frequency when the amplitude value reaches a predetermined value or greater, so as to obtain a high drive efficiency.

As shown in FIG. 7, the actuator 100 may further include a current value measuring device R for measuring the drive current supplied to the coil 11, where the drive frequency may be determined by deriving the natural frequency from a variation of the drive current value while incrementally altering the frequency of the current pulse to be supplied to the coil, since the drive frequency can be accurately determined. Also in this configuration, the drive frequency is generally a frequency when the drive current value reaches a minimum value, and alternatively the drive frequency can also be a frequency when the drive current value reaches a predetermined value or less, in order to obtain a high drive efficiency.

The natural frequency may be determined when the current is not supplied to the coil 11 so that the natural frequency can be detected while avoiding the interference of the power supply with the coil. Furthermore, if the natural frequency is determined at the end of the period while current is not supplied to the coil 11, the natural frequency can be detected more reliably and correctly.

When the detected natural frequency is out of a predetermined range, a pulse width of the drive current pulse is decreased. Thus, unnecessary power consumption during operation of the actuator 10, 100 under an abnormal condition can be suppressed. If the detected natural frequency has not changed after a predetermined time interval, the current supply to the coil 11 may be interrupted. Thus, unnecessary power consumption can be eliminated.

Furthermore, when the detected natural frequency has not changed for a predetermined time interval, the current supply to the coil 11 may be interrupted so as to avoid driving of the actuator under an unloaded condition, thereby avoiding unnecessary power consumption.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in Japanese Patent Application No. JP 11-304731, filed Oct. 26, 1999, which is expressly incorporated herein by reference in its entirety.

What is claimed:

1. A vibrating linear actuator, comprising:
    a stator;
    a spring vibration system comprising:
        a) a moving portion having a magnet;
        b) a spring configured to support said moving portion;
    an electromagnetic coil operably connected to said stator and configured to receive an electrical current, whereupon said coil moves said moving portion against a load supplied by said spring to reciprocally move said moving portion;
    a frequency detector configured to detect a natural frequency of said spring vibration system; and
    a frequency controller configured to determine a frequency of an electrical current pulse to be received by the coil, in accordance with a detection result of the detector.

2. The actuator according to claim 1, wherein:
    said stator includes one of an electromagnet and a permanent magnet; and
    said magnet of said moving portion includes one of an electromagnet and a permanent magnet.

3. The vibrating linear actuator according to claim 1, wherein:
    said frequency detector and said frequency controller further comprises an amplitude detector configured to detect a signal corresponding to an amplitude of the moving portion; and
    said frequency detector and said frequency controller are further configured to determine a drive frequency by deriving the natural frequency from a variation of an amplitude value while incrementally altering the frequency of the current pulse to be supplied to the coil.

4. The vibrating linear actuator according to claim 3, wherein said frequency detector and said frequency controller are further configured to determine the drive frequency when the amplitude value is at its maximum.

5. The vibrating linear actuator according to claim 3, wherein said frequency detector and said frequency controller are further configured to determine the drive frequency when the amplitude value reaches or exceeds a predetermined value.

6. The vibrating linear actuator according to claim 1, wherein:
    said frequency detector and said frequency controller further comprise a current value measuring device configured to measure a drive current supplied to the coil; and
    said frequency detector and said frequency controller are further configured to determine a drive frequency by deriving the natural frequency from a variation of a drive current value while incrementally altering the frequency of the current pulse to be supplied to the coil.

7. The vibrating linear actuator according to claim 6, wherein said frequency detector and said frequency controller are further configured to determine the drive frequency when the drive current value is at its minimum.

8. The vibrating linear actuator according to claim 6, wherein said frequency detector and said frequency controller are further configured to determine the drive frequency when the drive current value reaches or falls below a predetermined value.

9. The vibrating linear actuator according to claim 1, wherein said frequency detector and said frequency controller are further configured to determine the natural frequency while current is not being supplied to the coil.

10. The vibrating linear actuator according to claim 9, wherein said frequency detector and said frequency controller are further configured to determine the natural frequency at the end of a predetermined period during which current is not supplied to the coil.

11. The vibrating linear actuator according to claim 1, wherein said frequency detector and said frequency controller are configured to decrease a pulse width of the current pulse when the detected natural frequency is not within a predetermined range.

12. The vibrating linear actuator according to claim 11, wherein said frequency detector and said frequency controller are configured to interrupt the current supply to the coil when the detected natural frequency is out of the predetermined range during or after a predetermined time period.

13. The vibrating linear actuator according to claim 1, wherein said frequency detector and said frequency controller are configured to interrupt the current supply to the coil when the detected natural frequency remains unchanged for a predetermined time period.

14. A method for vibrating a linear actuator, the actuator having a stator, a spring vibration system including a moving portion having a magnet and a spring configured to support the moving portion, an electromagnetic coil operably connected to the stator, the method comprising:
    supplying the electromagnetic coil with electrical current
    reciprocally moving the coil against a load supplied by the spring, in response to said supplying of current;
    detecting a natural frequency of the spring vibration system;
    determining a frequency of an electrical current pulse, in accordance with the detected natural frequency;
    supplying the current pulse to the electromagnetic coil.

15. The method according to claim 14, further comprising:
    providing one of an electromagnet and a permanent magnet to the stator; and
    providing one of an electromagnet and a permanent magnet to the moving portion.

16. The method according to claim 14, further comprising:
    sensing a signal corresponding to an amplitude of the moving portion; and
    determining a drive frequency by deriving the natural frequency from a variation of an amplitude value while incrementally altering the frequency of the current pulse to be supplied to the coil.

17. The method according to claim 16, further comprising determining the drive frequency when the amplitude value is at its maximum.

18. The method according to claim 16, further comprising determining the drive frequency when the amplitude value reaches or exceeds a predetermined value.

19. The method according to claim 14, further comprising
measuring a drive current supplied to the coil; and
determining a drive frequency by deriving the natural frequency from a variation of a drive current value while incrementally altering the frequency of the current pulse to be supplied to the coil.

20. The method according to claim 19, further comprising determining the drive frequency when the drive current value is at its minimum.

21. The method according to claim 19, further comprising determining the drive frequency when the drive current value reaches or falls below a predetermined value.

22. The method according to claim 14, further comprising determining the natural frequency while current is not being supplied to the coil.

23. The method according to claim 22, further comprising determining the natural frequency at the end of a predetermined period and while the current is not supplied to the coil.

24. The method according to claim 14, further comprising decreasing a pulse width of the current pulse when the detected natural frequency is not within a predetermined range.

25. The method according to claim 24, further comprising interrupting the current supply to the coil when the detected natural frequency is out of the predetermined range during or after a predetermined time period.

26. The method according to claim 14, further comprising interrupting the current supply to the coil when the detected natural frequency remains unchanged for a predetermined time period.

* * * * *